Patented Oct. 2, 1951

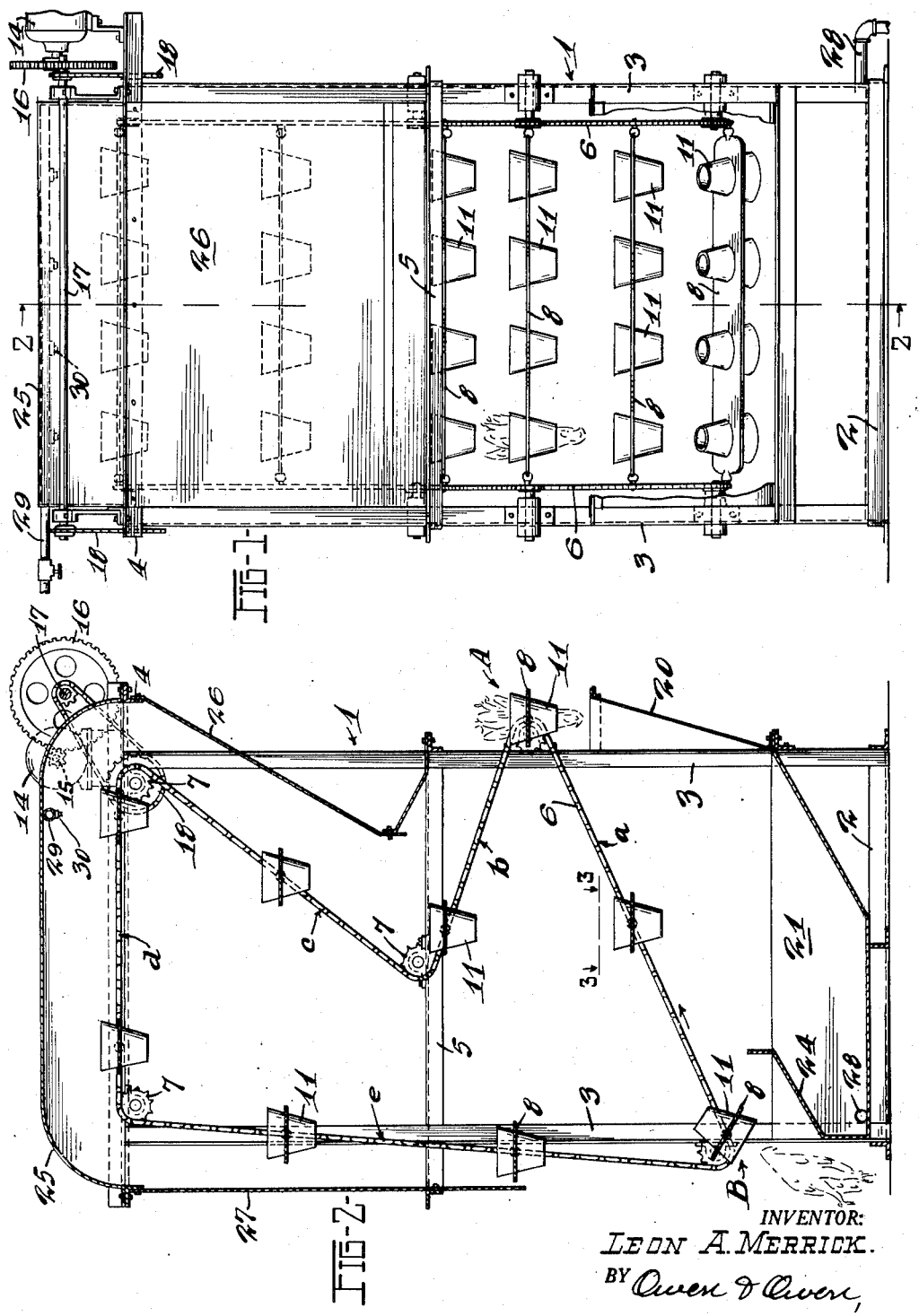

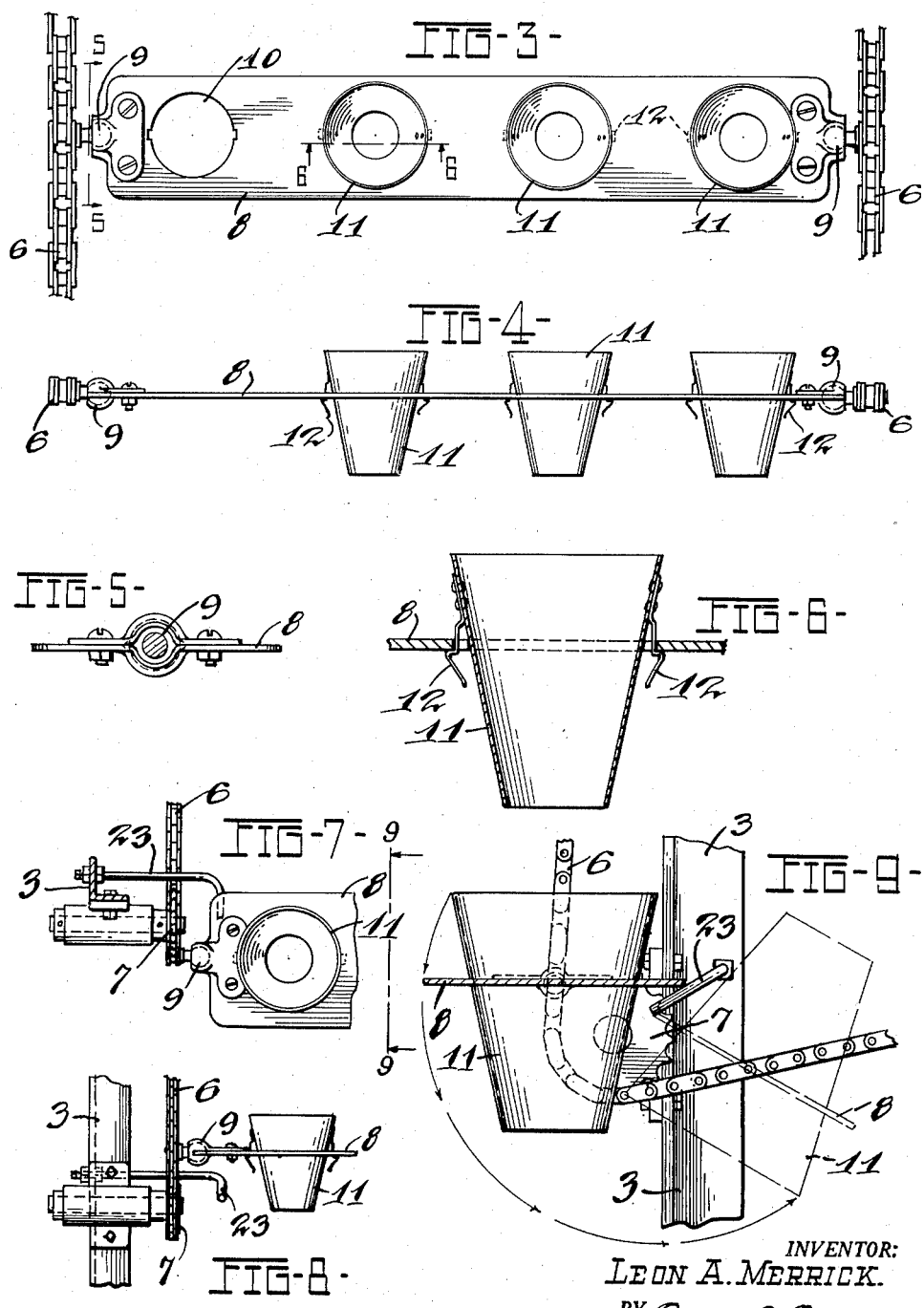

2,570,143

UNITED STATES PATENT OFFICE 2,570,143

POULTRY KILLING RACK

Leon A. Merrick, Adrian, Mich.

Application April 21, 1949, Serial No. 88,840

4 Claims. (Cl. 17—11)

This invention relates to poultry handling apparatus, and particularly to a rack of the endless conveyor type for holding poultry while being killed and during bleeding.

The primary object of the invention is the provision of an improved and simplified rack of this character that will hold poultry in convenient position for killing and bleeding, will prevent flopping and kicking resulting from muscular reflex, and will move the poultry in successive stages from killing position to discharging position, at which latter automatic discharge takes place after which the poultry holders return to poultry-receiving position.

Further objects and advantages of the invention will be apparent from the following detailed description, and from the accompanying drawings illustrating one embodiment of the invention, and in which—

Fig. 1 is a front elevation of a machine embodying the invention, which parts broken away and with birds in some of the holders provided therefor; Fig. 2 is a vertical section on the line 2—2 in Fig. 1; Fig. 3 is an enlarged fragmentary view on the line 3—3 in Fig. 2, with three bird-holding members in position on the conveyor cross-bar; Fig. 4 is a different view of the parts shown in Fig. 3; Figs. 5 and 6 are enlarged sections on the lines 5—5 and 6—6, respectively, in Fig. 3; Fig. 7 is a detail of the conveyor cross-bar tripping means which effects discharge of birds from the cross-bar with parts on a different scale than in Fig. 3; Fig. 8 is a different view thereof, and Fig. 9 is an enlarged fragmentary sectional detail of the conveyor means taken on the line 9—9 in Fig. 7 and illustrating the tripping bird discharging action of a cross-bar of the conveyor as it passes around the lower rear guide members.

Referring to the drawings, 1 designates the frame of the apparatus, which is rectangular in cross-section and comprises, in the present instance, a base portion 2, four corner uprights 3 rising from the base and a top portion 4. The uprights 3 are connected near their vertical centers with frame bars 5 which serve to brace the uprights and also to perform an additional function hereinafter described.

A pair of endless conveyor chains 6 are mounted in transversely spaced relation in the frame 1 with one chain adjacent to each side of the frame and guided for movement by respective sets of sprocket wheels 7. These wheels are positioned to provide the chains with respective travel paths $a$, $b$, $c$, $d$ and $e$. The paths $a$ and $d$ are respectively forward and rearward of the frame; the paths $b$ and $c$ are upward in angular relation at the front portion of the frame and the path $e$ is downward at the rear of the frame.

The chains 6 are connected at intervals by cross-bars 8 which have swivel connections at their ends with the respective chains, as shown at 9 in Figs. 3, 4 and 5, to permit free rotary movements of the bars about a longitudinally extending center axis which intersects the two chains. The cross-bars 8 are of substantially flat broad form and provided intermediate their ends with a series of spaced openings 10, four in the present instance, each adapted to receive a bird-holder 11 that is of hollow conical form open at its bottom and top and of sufficient size to permit the bird, for instance a chicken, to be positioned therein with the head hanging down from the lower open end of the holder and its feet projecting out from the top, as shown in Figs. 1 and 2. The cross-bars 8 with their holders 11 are normally held by gravity action with the holders in vertical position and with their large ends uppermost. The holders 11 are releasably held in the cross-bar openings 10 by spring catch fingers 12, as best shown in Fig. 6.

The chains are driven from an electric motor 14 mounted, in the present instance, on the top portion 4 of the frame. The rotor shaft of this motor has a small pinion 15 in mesh with a large pinion 16 on a cross-shaft 17 mounted at the upper front portion of the frame. This shaft has chain and sprocket connection 18 at each end thereof with the shaft of the upper front sprocket wheel 7 for each conveyor chain. The operation of the motor 14 may be controlled by the operator through a conveniently positioned switch (not shown).

The poultry-receiving position for the cross-bars 8 is at the station marked A located at the front side of the machine and, in the present instance, below the intermediate frame bars 5. When a conveyor cross-bar is in this position, the chickens or other poultry are placed in the holders 11 of the bar with their heads and necks extending below the holders in position to be cut and bled. When this work has been performed, the operator closes the motor control switch to cause the conveyor chains to move the cross-bar holding the bleeding birds rearwardly and upwardly through the path $b$ and until another cross-bar with empty holders is brought into the receiving position A when the motor is stopped. The sprockets 7 that are mounted on the intermediate bars 5 are disposed rearwardly from the front side of the machine so that the conveyor chains first take a rearward path *b* and then an upward and forward path *c* to the sprockets 7 at the upper front portion of the frame. A cross-bar 8 holding the bleeding birds is thus moved slowly and intermittently rearward and upward and then forward and upward in the frame and thence across the top and down at the rear to the poultry discharging position B.

At the front of the frame immediately below the receiving position A is provided a guard 20 which causes the blood dripping from the poultry in the receiving position to be directed down into a large pan or receptacle 21 in the bottom of the frame. This receptacle is open at its top so that the drippings from the poultry, as they pass up with the conveyor, may be received thereby.

When a cross-bar 8 reaches the discharging position B and passes around the lower rear set of sprocket wheels 7, the inner edge of the cross-bar strikes a trip finger 23, projecting inward from one of the rear frame uprights, and is caused thereby to be tipped over from the upright or horizontal position shown in full lines in Fig. 9 to the dotted line discharging position shown in such figure. As the cross-bar is tipped over, the poultry are discharged from the holders 11, as indicated in Fig. 2. An inclined guard 24 is provided over the adjacent rear end of the receptacle 21 so as to cause the poultry which may fall thereon to be directed to the rear side of the frame. When a cross-bar 8 at the discharging station has moved a sufficient distance around the adjacent sprocket wheels 7 to discharge the poultry therefrom, it is released from the trip finger 23 and permitted to assume its normal upright position and to travel in such position forward along the path *a* to the receiving position A.

A canopy or protecting cover 25 may be provided on the top of the frame over the run *d* of the conveyor, and this cover, if desired, may have front and rear aprons 26 and 27 extending a distance downward therefrom without the path of travel of the conveyor. It is preferable to have the front apron 26 extend rearwardly on a decline into the front portion of the frame and a short distance below the run *c* of the conveyor so as to direct any drippings from the poultry down into the bottom receptacle 21. The receptacle 21 is provided with a drainage-pipe 28 to facilitate washing and cleaning.

It is preferable to provide a water supply pipe 29 at the top portion of the frame beneath the canopy 25 and to provide this with a plurality of discharge nozzles 30 arranged to discharge a cleaning water onto the poultry in the holders 11 as they pass rearward along the path *d* at the top of the frame. It is preferable to arrange the discharge nozzles 30 over a rest position of the holders so that during such rest period the water may continue to discharge onto the poultry in the registering holders.

While the apparatus has been partially described for use in connection with the killing and bleeding of chickens and other poultry, it is apparent that it may be used for other purposes such as holding poultry for caponizing, capetting, blood testing and vaccinating operation.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a poultry killing rack, a frame, an endless conveyor guided for movements in the frame with a front path of travel a distance inwardly from a front bird-receiving point, then upwardly and outwardly on an incline, a rearward top path of travel, then a downward path of travel at the rear of the frame, and then forward to the receiving point, said conveyor having endless side members with a plurality of cross-bars connecting said members and spaced lengthwise thereof across bars having cone-shaped bird-receiving holders open at top and bottom with their large ends forming the top, said bars having their ends swiveled to said side members and normally standing by gravity with the large ends of said holders up, means for driving the conveyor, the birds to be killed being placed in the cones at the front receiving point with their heads hanging down through the cone bottoms in cutting and bleeding position, and means operable to turn each bar and its cone relative to the conveyor members and in a vertical plane when in the lower portion of its rear downward guided movement in the frame to discharge birds from the bar cones.

2. In a poultry killing rack, a frame, a blood-receiving pan in the bottom of the frame, an endless conveyor, means carried by the frame and guiding the conveyor for upward successive inward and outward movements through a front run over said pan from a bird-receiving and cutting position, thence rearward at the top of the frame, thence downward at the rear thereof and across the lower portion of the frame and over said pan to initial bird-receiving position, said conveyor having spaced endless side members and cross-bars connecting said members and spaced lengthwise thereof, said bars having swivel connection at each end with the respective member to turn relative thereto in a vertical plane, cone-shaped bird-receiving holders open at top and bottom and removably carried by each bar for swivel movements therewith and normally standing in upright position with their large ends up, the birds to be killed being placed in the large upper ends of the cones with their heads hanging down through the lower small ends when at the lower end portion of said upward front run, and means operable to intermittently move the conveyor through its course of movement.

3. In a poultry killing rack, a frame, a blood-receiving pan in the bottom of the frame, an endless conveyor, means carried by the frame and guiding the conveyor for upward successive inward and outward movements through a front run over said pan from a bird-receiving and cutting position, thence rearward at the top of the frame, thence downward at the rear thereof and across the lower portion of the frame and over said pan to initial bird-receiving position, said conveyor having spaced endless side members and cross-bars connecting said members and spaced lengthwise thereof, said bars having swivel connection at each end with the respective member to turn relative thereto in a vertical plane, cone-shaped bird-receiving holders open at top and bottom and removably carried by each bar for swivel movements therewith and normally standing in upright position with their large ends up, the birds to be killed being placed in the large upper ends of the cones with their heads hanging down through the lower small ends when at the lower end portion of said upward front run, and means operable to intermittently move the conveyor through its course of movement, and means operable to tilt each cross-bar and discharge birds from its holders when the bar is at the lower portion of said rear run.

4. In a poultry killing rack, a frame, a blood-receiving pan in the bottom of the frame, an endless conveyor mounted and guided for movements in the frame with an upward front run, a rearward down run and cross runs at the top and bottom portions of the frame above the pan, said conveyor comprising a pair of transversely spaced endless side members and a plurality of cross-bars connecting said members at predetermined spaced intervals, said cross-bars having openings therein, bird holders removably mounted in said openings and being of cone-form with open top and bottom portions with their large ends normally up to receive birds therein with the heads and necks thereof projecting down through the lower small ends of the cones, the birds being received in the holders when at the lower end portion of the upward front run and over the pan, and means operable to intermittently move said conveyor to advance the cross-bars in successive stages from bird-receiving position.

LEON A. MERRICK.

REFERENCES CITED

The following references are of record in the file of this patent:

UNITED STATES PATENTS

| Number | Name | Date |
|---|---|---|
| 621,116 | Mandel | Mar. 14, 1899 |
| 654,369 | Wagner | July 24, 1900 |
| 734,063 | Hauck | July 21, 1903 |
| 1,416,443 | Brown | May 16, 1922 |
| 1,734,585 | Ladewig et al. | Nov. 5, 1929 |
| 1,746,645 | Fox | Feb. 11, 1930 |
| 1,756,554 | Hippenmeyer | Apr. 29, 1930 |
| 2,490,761 | McDowell | Dec. 6, 1949 |